US012692372B2

(12) United States Patent
Ota et al.

(10) Patent No.: US 12,692,372 B2
(45) Date of Patent: Jul. 28, 2026

(54) RESIN COMPOSITION

(71) Applicant: Plantic Technologies Ltd, Altona (AU)

(72) Inventors: Masahiko Ota, Kurashiki (JP); Akihiro Kotaka, Kurashiki (JP); Nicholas John McCaffrey, Altona (AU)

(73) Assignee: Plantic Technologies Ltd, Altona (AU)

( * ) Notice: Subject to any disclaimer, the term of this patent is extended or adjusted under 35 U.S.C. 154(b) by 889 days.

(21) Appl. No.: 17/795,063

(22) PCT Filed: Feb. 3, 2021

(86) PCT No.: PCT/IB2021/050847
§ 371 (c)(1),
(2) Date: Jul. 25, 2022

(87) PCT Pub. No.: WO2021/156751
PCT Pub. Date: Aug. 12, 2021

(65) Prior Publication Data

US 2023/0092120 A1 Mar. 23, 2023

(30) Foreign Application Priority Data

Feb. 3, 2020 (JP) ................................ 2020-016107

(51) Int. Cl.
*C08L 3/08* (2006.01)
*A47G 19/22* (2006.01)
(Continued)

(52) U.S. Cl.
CPC ............ *C08L 3/08* (2013.01); *A47G 19/2205* (2013.01); *A47G 23/06* (2013.01); *B29C 43/003* (2013.01); *B29C 48/0017* (2019.02); *B29C 48/0021* (2019.02); *B29C 48/08* (2019.02); *B29C 48/154* (2019.02); *B29C 48/21* (2019.02); *B29C 48/80* (2019.02); *B29C 48/875* (2019.02); *B29C 48/914* (2019.02); *B29C 51/002* (2013.01); *B32B 1/00* (2013.01); *B32B 7/12* (2013.01); *B32B 9/02* (2013.01); *B32B 9/04* (2013.01); *B32B 9/06* (2013.01); *B32B 27/10* (2013.01); *B32B 27/285* (2013.01); *B32B 27/306* (2013.01); *B32B 27/36* (2013.01); *B32B 27/38* (2013.01); *B65D 5/503* (2013.01); *B65D 65/42* (2013.01); *C08J 5/18* (2013.01); *C08L 3/04* (2013.01); *C08L 3/06* (2013.01); *C08L 29/04* (2013.01); *C08L 71/02* (2013.01); *C09D 7/65* (2018.01); *C09D 103/06* (2013.01); *C09D 103/08* (2013.01); *C09D 129/04* (2013.01); *B29C 43/28* (2013.01); *B29C 48/022* (2019.02); *B29C 48/305* (2019.02); *B29K 2003/00* (2013.01); *B29K 2023/00* (2013.01);
(Continued)

(58) Field of Classification Search
CPC .... C08L 3/08; C08L 3/06; C08L 29/04; C08L 3/04; C08L 71/02; C08L 2203/16; C08L 2203/30; C08L 2205/03; B65D 5/503; B65D 65/42; C08J 5/18; C08J 2303/06; C08J 2303/08; C08J 2329/04; C09D 103/06; C09D 103/08; C09D 129/04; C09D 7/65; B29C 43/003; B29C 48/80; B29C 48/154; B29C 48/21; B29C 48/875; B29C 48/914; B29C 48/08; B29C 48/0021; B29C 48/0017; B29C 51/002; B29C 43/28; B29C 48/022; B29C 48/305; B32B 1/00; B32B 7/12; B32B 9/02; B32B 27/285; B32B 27/306; B32B 27/36; B32B 2250/03; B32B 2250/40; B32B 2307/558; B32B 2250/24; B32B 2307/7244; B32B 2307/738; B32B 2439/70; B32B 2307/7163; B32B 2439/02; B32B 9/04; B32B 9/06; B32B 27/10; B32B 27/38; B29K 2027/06; B29K 2003/00; B29K 2023/00; B29K 2029/04; Y02W 90/10; A47G 23/06; A47G 19/2205
See application file for complete search history.

(56) References Cited

U.S. PATENT DOCUMENTS 6,569,539 B2 5/2003 Bentmar et al.
7,939,599 B2 5/2011 Ding et al.
(Continued)

FOREIGN PATENT DOCUMENTS

CN 1648157 A 8/2005
CN 104936779 A * 9/2015 ............ B32B 27/08
(Continued)

OTHER PUBLICATIONS

Machine English translation of CN 104936779, Yamamura et al., Sep. 23, 2015.*

(Continued)

*Primary Examiner* — Patrick D Niland
(74) *Attorney, Agent, or Firm* — Morgan, Lewis & Bockius LLP

(57) ABSTRACT

Provided is a resin composition capable of forming a coated product that exhibits low adhesion to a metal roll during production and is superior in oxygen barrier property and capable of forming a film or sheet superior in oxygen barrier property, impact strength under low humidity and color tone. The resin composition of the present invention contains 50 to 98 parts by mass of a modified starch (A), 2 to 50 parts by mass of a polyvinyl alcohol (B), 0.1 to 10 parts by mass of a polyoxyalkylene (C), and optionally 0 to 5 parts of a polyol plasticizer (D), wherein the total content of the (A), (B), (C) and (D) is 100 parts by mass.

20 Claims, 2 Drawing Sheets

(51) Int. Cl.

| | |
|---|---|
| ***A47G 23/06*** | (2006.01) |
| ***B29C 43/00*** | (2006.01) |
| ***B29C 48/00*** | (2019.01) |
| ***B29C 48/08*** | (2019.01) |
| ***B29C 48/154*** | (2019.01) |
| ***B29C 48/21*** | (2019.01) |
| ***B29C 48/80*** | (2019.01) |
| ***B29C 48/875*** | (2019.01) |
| ***B29C 48/88*** | (2019.01) |
| ***B29C 51/00*** | (2006.01) |
| ***B32B 1/00*** | (2024.01) |
| ***B32B 7/12*** | (2006.01) |
| ***B32B 9/02*** | (2006.01) |
| ***B32B 9/04*** | (2006.01) |
| ***B32B 9/06*** | (2006.01) |
| ***B32B 27/10*** | (2006.01) |
| ***B32B 27/28*** | (2006.01) |
| ***B32B 27/30*** | (2006.01) |
| ***B32B 27/36*** | (2006.01) |
| ***B32B 27/38*** | (2006.01) |
| ***B65D 5/50*** | (2006.01) |
| ***B65D 65/42*** | (2006.01) |
| ***C08J 5/18*** | (2006.01) |
| ***C08L 3/04*** | (2006.01) |
| ***C08L 3/06*** | (2006.01) |
| ***C08L 29/04*** | (2006.01) |
| ***C08L 71/02*** | (2006.01) |
| ***C09D 7/65*** | (2018.01) |
| ***C09D 103/06*** | (2006.01) |
| ***C09D 103/08*** | (2006.01) |
| ***C09D 129/04*** | (2006.01) |
| *B29C 43/28* | (2006.01) |
| *B29C 48/305* | (2019.01) |
| *B29K 23/00* | (2006.01) |
| *B29K 27/06* | (2006.01) |
| *B29K 29/00* | (2006.01) |

(52) U.S. Cl.

CPC ...... *B29K 2027/06* (2013.01); *B29K 2029/04* (2013.01); *B32B 2250/03* (2013.01); *B32B 2250/24* (2013.01); *B32B 2250/40* (2013.01); *B32B 2307/558* (2013.01); *B32B 2307/7163* (2013.01); *B32B 2307/7244* (2013.01); *B32B 2307/738* (2013.01); *B32B 2439/02* (2013.01); *B32B 2439/70* (2013.01); *C08J 2303/06* (2013.01); *C08J 2303/08* (2013.01); *C08J 2329/04* (2013.01); *C08L 2203/16* (2013.01); *C08L 2203/30* (2013.01); *C08L 2205/025* (2013.01); *C08L 2205/03* (2013.01); *C08L 2205/035* (2013.01); *Y02W 90/10* (2015.05)

(56) References Cited

U.S. PATENT DOCUMENTS

| | | | | |
|---|---|---|---|---|
| 2008/0153958 | A1 | 6/2008 | Ding et al. | |
| 2010/0307951 | A1* | 12/2010 | Khemani ................ | B29B 7/728<br>523/128 |

FOREIGN PATENT DOCUMENTS

| | | | |
|---|---|---|---|
| JP | 4782284 | B2 | 9/2011 |
| WO | 00/36006 | A1 | 6/2000 |
| WO | 2006/042364 | A1 | 4/2006 |
| WO | 2007/140538 | A1 | 12/2007 |

OTHER PUBLICATIONS

Extended European Search Report issued in the corresponding Application No. 21750202.0, dated Mar. 4, 2024.

Jagadish et al., "Properties and sorption studies of polyethylene oxide-starch blended films," Food Hydrocolloids, 25: 1572-1580 (2011).

International Search Report issued in corresponding International Patent Application No. PCT/IB2021/050847 dated May 14, 2021.

International Preliminary Report on Patentability and Written Opinion issued in corresponding International Patent Application No. PCT/IB2021/050847 dated Jul. 28, 2022.

Chinese Master's Theses Full-text Database Engineering Science and Technology I (2013).

Yu, Haoqiang, CPCH2261353P, Chinese Master's Theses Full-text Database, Engineering Science and Technoloy I, dated Apr. 16, 2014.

* cited by examiner

[Fig.1]
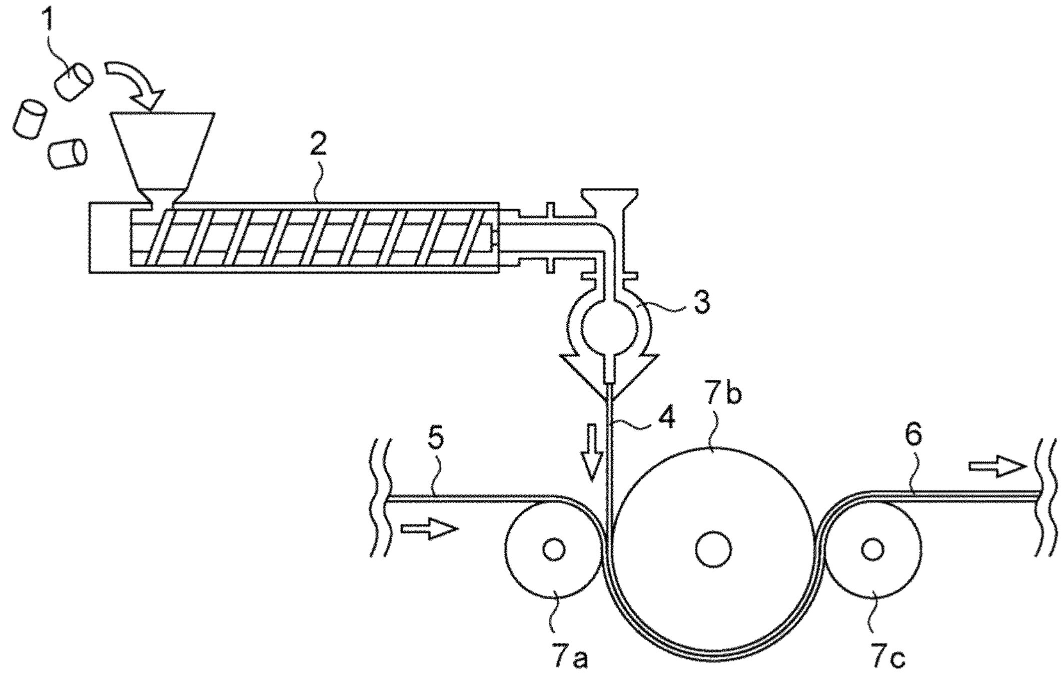

[Fig. 2]
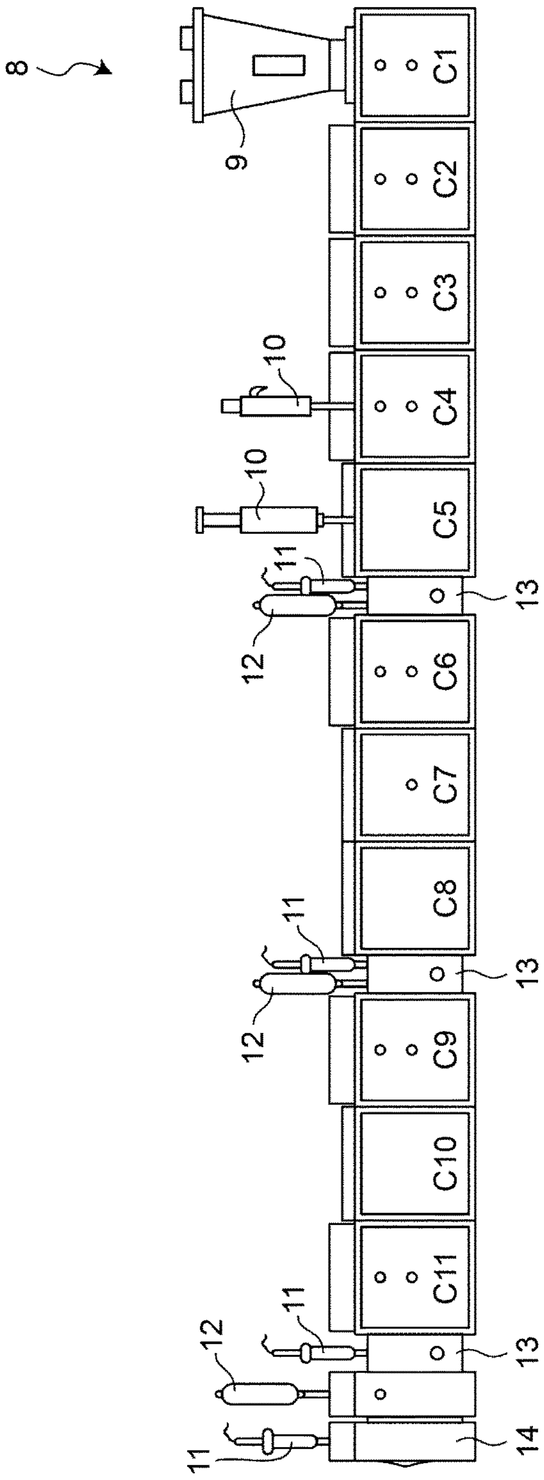

RESIN COMPOSITION

TECHNICAL FIELD

The present invention relates to a resin composition to be used for a food packaging container, etc., a hydrous composition comprising the resin composition, a coated product in which a paper or film is coated with the hydrous composition and a method for producing the same, a multilayer structure comprising the coated product, a film or sheet comprising the resin composition, a laminate comprising the film or sheet, a packaging material comprising the coated product or the multilayer structure, and a packaging tray or cup comprising the film or sheet or the laminate and a method for producing the same.

BACKGROUND ART

Heretofore, since a resin composition comprising modified starch and polyvinyl alcohol is superior in biodegradability, it has been widely used in a container for packaging foods (for example, JP-B-4782284).

PRIOR ART DOCUMENTS

Patent Documents

Patent Document 1: JP-B-4782284

SUMMARY OF THE INVENTION

Problems to be Solved by the Invention

These containers for packaging foods include many containers using a coated product in which a paper or a film is coated with the resin composition or a hydrous composition containing water as a material as well as many laminates of the film or sheet comprising the resin composition with moisture-proof resin and their thermoformed containers. The coated products and the thermoformed containers are required to have high oxygen barrier property.

The coated product is produced, for example, by coating the paper or film conveyed by a winding device with the hydrous composition discharged through the die outlet of the extruder. However, according to the study of the present inventor, it was found that since a hydrous composition capable of ensuring a high oxygen barrier property has high adhesion to metal, it sticks to a metal roll during its conveyance by a winding device, so that breakage or the like of the coated product may occur. It was also found that the resistance to folding when the coated product was folded was not sufficient.

It was also found that in the case of a film or sheet, the color tone and the impact strength under low humidity are not sufficient, which may spoil the appearance of foods, and there is a problem that a container ruptures when the container is impacted during low humidity storage such as in a refrigerated environment.

Then, it is an object of the present invention to overcome the conventional problems in the production of both shaped articles of a coated product and a film or a sheet. Regarding the coated product, it is an object to provide a resin composition that exhibits low adhesion to a metal roll during the production thereof and is capable of forming a coated product superior in oxygen barrier property and resistance to folding, a hydrous composition comprising the resin composition, a coated product in which a paper or a film is coated with the hydrous composition, and a method for producing the same, a multilayer structure comprising the coated product, and a packaging material comprising the coated product or the multilayer structure. Further, regarding the film or sheet, it is an object to provide a resin composition that is capable of forming a film or sheet superior in oxygen barrier property, impact strength under low humidity and color tone, a film or sheet comprising the resin composition, a laminate comprising the film or sheet, and a packaging tray or cup comprising the film or sheet or the laminate and a method for producing the same. In the present description, the oxygen barrier property has a meaning including the oxygen barrier property of a coated product and a film or sheet unless otherwise stated.

Means for Solving Problems

As a result of diligent studies for solving the above-described problems, the present inventor has found that the problems can be solved by a configuration wherein a resin composition comprises 50 to 98 parts by mass of a modified starch (A), 2 to 50 parts by mass of a polyvinyl alcohol (B), 0.1 to 10 parts by mass of a polyoxyalkylene (C), and optionally 0 to 5 parts by mass of a polyol plasticizer (D), and thus has accomplished the present invention.

[1] A resin composition comprising:

50 to 98 parts by mass of a modified starch (A);

2 to 50 parts by mass of a polyvinyl alcohol (B);

0.1 to 10 parts by mass of a polyoxyalkylene (C); and optionally 0 to 5 parts by mass of a polyol plasticizer (D), wherein the total content of the (A), (B), (C) and (D) is 100 parts by mass.

[2] The resin composition according to [1], wherein the total content of the (A), (B), (C) and (D) is 80% by mass or more with respect to the mass of the resin composition.

[3] The resin composition according to [1] or [2], wherein the modified starch (A) has an average amylose content of 50% by mass or more.

[4] The resin composition according to any one of [1] to [3], wherein the modified starch (A) is at least one selected from the group consisting of an etherified starch, an esterified starch, a cationized starch, and a crosslinked starch.

[5] The resin composition according to any one of [1] to [4], wherein the modified starch (A) is at least one selected from the group consisting of an etherified starch having a hydroxyalkyl group having 2 to 6 carbon atoms and an esterified starch having a structural unit derived from a dicarboxylic anhydride.

[6] The resin composition according to any one of [1] to [5], wherein a 4% aqueous solution of the polyvinyl alcohol (B) has a viscosity of 1 to 50 mPa·s at 20° C. measured in accordance with JIS Z 8803.

[7] A hydrous composition comprising the resin composition according to any one of [1] to [6], wherein the hydrous composition has a water content of 1 to 50% by mass.

[8] A coated product in which a paper or a film is coated with the hydrous composition according to [7].

[9] A multilayer structure comprising the coated product according to [8] and one or more layers (X).

[10] A packaging material comprising the coated product according to [8] or the multilayer structure according to [9].

[11] A method for producing the coated product according to [8], comprising a step of coating a paper or a film conveyed by a winding device with the hydrous composition according to [7] by using an extruder, wherein during the step, a draw ratio is 5 to 20 where the draw ratio is represented by Formula (1):

$$\text{Draw Ratio}=(\text{Winding speed of the winding device})/(\text{Flow rate at a die outlet of the extruder}) \quad (1).$$

[12] A film or sheet comprising the resin composition according to any one of [1] to [6].

[13] A laminate comprising the film or sheet according to [12] and one or more layers (X).

[14] A packaging tray or cup comprising the film or sheet according to [12] or the laminate according to [13].

[15] A method for producing the packaging tray or cup according to [14], comprising a step of obtaining a film or sheet by shaping the resin composition according to any one of [1] to [6] by using an extruder, a step of obtaining a laminate by laminating the resulting film or sheet and one or more layers (X) together by lamination, and a step of thermoforming the resulting laminate into a packaging tray or cup.

Effects of the Invention

The resin composition of the present invention exhibits low adhesion to a metal roll during the production thereof, so that its sticking to a metal roll can be effectively prevented and can afford a coated product superior in oxygen barrier property and resistance to folding. In addition, the resin composition of the present invention can afford a film or sheet superior in oxygen barrier property, impact strength under low humidity, and color tone. For these reasons, it can be suitably used as a material for a packaging, a container, etc. for foods.

BRIEF DESCRIPTION OF THE DRAWINGS

FIG. 1 is a schematic diagram showing the process of the production of a coated product in Examples.

FIG. 2 is a schematic view of the twin screw extruder used in Examples.

EMBODIMENTS OF THE INVENTION

[Resin Composition]

The resin composition of the present invention comprises 50 to 98 parts by mass of a modified starch (A), 2 to 50 parts by mass of a polyvinyl alcohol (B), 0.1 to 10 parts by mass of a polyoxyalkylene (C), and optionally 0 to 5 parts by mass of a polyol plasticizer (D), wherein the total content of the (A), (B), (C) and (D) is 100 parts by mass.

The present inventor found that if a resin composition contains 0.1 to 10 parts by mass of a polyoxyalkylene (C) in addition to 50 to 98 parts by mass of a modified starch (A) and 2 to 50 parts by mass of a polyvinyl alcohol (B), the adhesion to a metal roll during the production of a coated product can be significantly reduced and the resistance to folding can be improved while a superior oxygen barrier property is maintained. It is presumed that this is because the polyoxyalkylene (C) has the function of weakening the adhesion force of the hydroxyl groups of the modified starch (A) and the polyvinyl alcohol (B) to metal and the function of enhancing the strength.

In addition, the present inventor also found that such a composition affords a good winding property during production and can increase the maximum draw ratio. It is presumed that this is because the polyoxyalkylene (C) has the function of weakening hydrogen bonding of the hydroxyl groups of the modified starch (A) and the polyvinyl alcohol (B) with water in a hydrous composition. In the present description, the winding property means a characteristic that when a paper or a film conveyed is coated with a hydrous composition discharged through a die outlet of an extruder, the hydrous composition can be coated without being torn. The expression that the winding property is improved or enhanced means that it becomes easy to coat the hydrous composition without allowing it to tear when a paper or a film is conveyed at a high speed.

In addition, it has been found that with a film or sheet comprising the resin composition of the present invention, a yellowish color tone of a shaped article is suppressed and impact strength under low humidity is improved while a superior oxygen barrier property is maintained. It is presumed that this is because the polyoxyalkylene (C) has the function of weakening hydrogen bonding of the hydroxyl groups of the modified starch (A) and the polyvinyl alcohol (B) with water in a hydrous composition, suppressing a decomposition reaction during production, and enhancing the strength of the resulting film or sheet.

<Modified Starch (A)>

The modified starch (A) is preferably at least one selected from the group consisting of an etherified starch, an esterified starch, a cationized starch, and a crosslinked starch.

Examples of the starch include starches derived from cassava, corn, potato, sweet potato, sago, tapioca, sorghum, bean, bracken, lotus, *Trapa japonica*, wheat, rice, oat, arrowroot, and pea. Inter alia, starch derived from corn or cassava is preferable, and starch derived from high amylose corn is further preferable. Starch may be used singly, or two or more kinds of starch may be used in combination.

Examples of the etherified starch include alkyl etherified starches, such as methyl etherified starch; carboxyalkyl etherified starches, such as carboxymethyl etherified starch; and hydroxyalkyl etherified starches, such as etherified starch having a hydroxyalkyl group having 2 to 6 carbon atoms. Alternatively, allyl etherified starches and the like can also be used.

Examples of the esterified starch include esterified starches having a structural unit derived from carboxylic acid, such as esterified starch having a structural unit derived from acetic acid; esterified starches having a structural unit derived from a dicarboxylic anhydride, such as esterified starch having a structural unit derived from maleic anhydride, esterified starch having a structural unit derived from phthalic anhydride, and esterified starch having a structural unit derived from octenylsuccinic anhydride; and esterified starches having a structural unit derived from oxo acid, such as nitric acid esterified starch, phosphoric acid esterified starch, and urea-phosphoric acid esterified starch. Other examples thereof include xanthogenic acid esterified starch and acetoacetic acid esterified starch.

Examples of the cationized starch include a reaction product of starch and 2-diethylaminoethyl chloride and a reaction product of starch and 2,3-epoxypropyltrimethylammonium chloride.

Examples of the crosslinked starch include formaldehyde-crosslinked starch, epichlorohydrin-crosslinked starch, phosphoric acid-crosslinked starch, and acrolein-crosslinked starch.

From the viewpoint of film forming property at the time of the production of a film or sheet and a coated product, the modified starch (A) is preferably at least one selected from the group consisting of an etherified starch having a hydroxyalkyl group having 2 to 6 carbon atoms and an esterified starch having a structural unit derived from a dicarboxylic anhydride, and is more preferably at least one selected from the group consisting of hydroxyethyl etherified starch, hydroxypropyl etherified starch, hydroxybutyl etherified starch, an esterified starch having a structural unit derived from maleic anhydride, an esterified starch having a structural unit derived from phthalic anhydride, and an esterified starch having a structural unit derived from octenylsuccinic anhydride. The modified starch (A) may be used singly, or two or more species thereof may be used in combination. In the present description, the number of carbon atoms prefixed to "starch" indicates the number of carbon atoms of a group that has substituted for one hydroxyl group in the starch (a group formed by modifying one hydroxyl group in the starch). For example, an etherified starch having a hydroxyalkyl group having 2 to 5 carbon atoms indicates that the number of carbon atoms of the hydroxyalkyl group formed by modifying one hydroxyl group is in the starch is 2 to 5.

The etherified starch having a hydroxyalkyl group having 2 to 6 carbon atoms may be an etherified starch obtained by a reaction between alkylene oxide such as ethylene oxide, propylene oxide, or butylene oxide, and starch. The average number of hydroxy groups to be used in modification is preferably 0.05 to 2 per one glucose unit in the starch.

In the modified starch (A), the average amylose content of the modified starch (A) is preferably 50% by mass or more, more preferably 55% by mass or more, even more preferably 60% by mass or more, further preferably 65% by mass or more, and particularly preferably 70% by mass or more. When the average amylose content is equal to or greater than the aforementioned lower limit, it is easy to enhance the oxygen barrier property, the biodegradability and the shaping processability. The content of amylose in the modified starch (A) is usually 90% by mass or less. In the present description, the amylose content can be measured by, for example, the colorimetric iodine method described in "Starch Vol. 50, No. 4, 158-163 (1998)." When the modified starch contains only a single kind of modified starch, the average amylose content means the amylose content of the single modified starch. When two or more modified starches are used, the average amylose content is determined by weighted averaging the amylose contents of the two or more modified starches. For this reason, for example, when two or more modified starches are used and the average amylose content is adjusted to 50% by mass or more, a modified starch with an amylose content of less than 50% by mass may be contained.

In the modified starch (A), the water content in the modified starch (A) is preferably 5 to 15% by mass.

As the modified starch (A), a commercially available modified starch may be used. Examples of a representative commercial product of the modified starch (A) include ECOFILM (trademark) and National 1658 (trademark), which are hydroxypropyl etherified starches manufactured by Ingredion Incorporated.

The content of the modified starch (A) is 50 to 98 parts by mass per 100 parts by mass in total of the components (A), (B), (C) and (D). If the content of the modified starch (A) is less than 50 parts by mass or more than 98 parts by mass, the adhesion to a metal roll during production tends to be high, and the oxygen barrier property, the winding property, the maximum draw ratio, the resistance to folding, the impact strength under low humidity, and the color tone tend to deteriorate.

The content of the modified starch (A) is 50 parts by mass or more, preferably 60 parts by mass or more, more preferably 70 parts by mass or more, and even more preferably 80 parts by mas or more, whereas it is 98 parts by mass or less, preferably 95 parts by mass or less, and more preferably 90 parts by mass or less. When the content of the modified starch (A) is in the above range, it is easy to reduce the adhesion to a metal roll during production and it is also easy to enhance the oxygen barrier property, the winding property, the maximum draw ratio, the resistance to folding, the impact strength under low humidity, and the color tone. In the present description, "to be superior in color tone" means that the degree of coloring is low, for example, that the b value (yellow index, YI) is low. The expression "the color tone is enhanced or improved" means that the degree of coloring is reduced, for example, that the b value is reduced.

<Polyvinyl Alcohol (B)>

The polyvinyl alcohol (B) contained in the resin composition of the present invention preferably has a degree of saponification of 80 to 99.8 mol %. When the degree of saponification of the polyvinyl alcohol (B) is within the above range, it is easy to enhance the winding property, the maximum draw ratio and the oxygen barrier property. The degree of saponification is more preferably 85 mol % or more, and even more preferably 88 mol % or more. In the present description, the degree of saponification refers to the molar fraction of hydroxyl groups to the total of hydroxyl groups and ester groups in the polyvinyl alcohol (B).

The polyvinyl alcohol (B) can further comprise another monomer unit other than a vinyl alcohol unit. Examples of the other monomer unit include monomer units derived from ethylenically unsaturated monomers. Examples of the ethylenically unsaturated monomers include α-olefins such as ethylene, propylene, n-butene, isobutylene, and 1-hexene; acrylic acid and salts thereof; unsaturated monomers having an acrylic acid ester group; methacrylic acid and salts thereof; unsaturated monomers having a methacrylic acid ester group; acrylamide, N-methylacrylamide, N-ethylacrylamide, N, N-dimethylacrylamide, diacetoneacrylamide, acrylamidopropanesulfonic acid and salts thereof, acrylamidopropyldimethylamine and salts thereof (e.g., quaternary salts); methacrylamide, N-methylmethacrylamide, N-ethylmethacrylamide, methacrylamidopropanesulfonic acid and salts thereof, methacrylamidopropyldimethylamine and salts thereof (e.g., quaternary salts); vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; vinyl cyanides such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate, 2,3-diacetoxy-1-allyloxypropane, and allyl chloride; unsaturated dicarboxylic acids such as maleic acid, itaconic acid, and fumaric acid, and salts or esters thereof; vinylsilyl compounds such as vinyltrimethoxysilane; isopropenyl acetate; vinyl ester monomers such as vinyl formate, vinyl acetate, vinyl propionate, vinyl butyrate, vinyl isobutyrate, vinyl pivalate, vinyl versatate, vinyl caproate, vinyl calrylate, vinyl laurate, vinyl palmitate, vinyl stearate, vinyl oleate, and vinyl benzoate. Additionally, monomer units derived from unsaturated monomers that have not been saponified are also included in the other monomer unit. The content of the other monomer unit is preferably 10 mol % or less, and more preferably 5 mol % or less.

The method for producing the polyvinyl alcohol (B) is not particularly limited. Examples thereof include a method comprising polymerizing a vinyl alcohol monomer optionally with another monomer, and saponifying the resulting polymer to convert into a vinyl alcohol unit. Examples of a polymerization manner used in polymerization include batch polymerization, semi-batch polymerization, continuous polymerization, and semi-continuous polymerization. Examples of the polymerization method include known methods such as a mass polymerization method, a solution polymerization method, a suspension polymerization method, and an emulsion polymerization method. As the saponification of the polymer, a known method can be applied. For example, the saponification may be performed in a state where the polymer is dissolved in an alcohol or a hydrous alcohol. The alcohol that can be used at that time is a lower alcohol such as methanol and ethanol.

The viscosity at 20° C. of a 4% aqueous solution of the polyvinyl alcohol (B) as measured in accordance with JIS Z 8803 is preferably 1 mPa·s or more, more preferably 2 mPa·s or more, and even more preferably 3 mPa·s or more, whereas it is preferably 45 mPa·s or less, and more preferably 35 mPa·s or less. When the viscosity of the polyvinyl alcohol (B) is equal to or greater than the above lower limit, the oxygen barrier property tends to be improved, and when the viscosity is equal to or lower than the above upper limit, it is easy to enhance the winding property and the maximum draw ratio. The viscosity of the polyvinyl alcohol (B) can be measured using a viscometer and can be measured, for example, by the method described in Examples.

The content of the polyvinyl alcohol (B) is 2 to 50 parts by mass with respect to 100 parts by mass in total of the components (A), (B), (C) and (D). If the content of the polyvinyl alcohol (B) is less than 2 parts by mass or more than 50 parts by mass, the adhesion to a metal roll during production tends to increase, and the oxygen barrier property, the winding property, the maximum draw ratio, the resistance to folding, and the impact strength under low humidity tend to decrease.

The content of the polyvinyl alcohol (B) is 2 parts by mass or more, and preferably 5 parts by mass or more, whereas it is 50 parts by mass or less, preferably 40 parts by mass or less, more preferably 30 parts by mass or less, and even more preferably 25 parts by mass or less. When the content of the polyvinyl alcohol (B) is equal to or more than the above lower limit, it is easy to enhance the oxygen barrier property, the winding property, the maximum draw ratio, the resistance to folding, and the impact strength under low humidity, and when the content is equal to or less than the above upper limit, it is easy to lower the adhesion to a metal roll during production.

<Polyoxyalkylene (C)>

The polyoxyalkylene (C) represents a polyalkylene oxide and a polyalkylene glycol and has a structural unit represented by the following Formula (2) (also referred to as a structural unit (2)). The polyoxyalkylene (C) may have two or more different structural units (2).

[Chemical Formula 1]

$$-[R-O]_n- \quad (2)$$

[In the formula, R is an alkylene group and n is 1 or more.]

In the Formula (2), examples of the alkylene group include alkylene groups having 2 to 10 carbon atoms such as an ethylene group, a propylene group, a trimethylene group, a butylene group, an isobutylene group, a pentylene group, a hexylene group, a heptylene group, an octylene group, a nonylene group and a decylene group. Among these, alkylene groups having 2 to 6 carbon atoms are preferable from the viewpoint of being easy to lower the adhesion to a metal roll during production and being easy to enhance the winding property, the maximum draw ratio, the resistance to folding, and the impact strength under low humidity, and an ethylene group and/or a propylene group is more preferable. When n is 2 or more, these alkylene groups may be used singly or two or more of them may be used in combination.

n in the Formula (2) is preferably 5 or more, more preferably 50 or more, even more preferably 100 or more, and is preferably 120,000 or less, and more preferably 70,000 or less. When n is in the above range, it is easy to enhance the oxygen barrier property, the winding property, the maximum draw ratio, the resistance to folding, and the impact strength under low humidity, and it is easy to lower the adhesion to a metal roll at during production. When the polyoxyalkylene (C) contains different structural units (2), the number of repetition n of each structural unit may be the same or different.

Examples of the polyalkylene oxide include polymers having a structural unit derived from an alkylene oxide having 2 to 6 carbon atoms, and specifically include polyethylene oxide, polypropylene oxide, polytrimethylene oxide (polyoxethane), polybutylene oxide, polyisobutylene oxide, and copolymers of monomers constituting the foregoing. Examples of the polyalkylene glycol include polymers having a structural unit derived from an alkylene glycol having 2 to 6 carbon atoms, and specifically include polyethylene glycol, polypropylene glycol, polytrimethylene glycol, polybutylene glycol, polyisobutylene glycol, and copolymers of monomers constituting the foregoing. Among these, the polyoxyalkylene (C) is preferably polyethylene oxide, polypropylene oxide, polyethylene glycol, polypropylene glycol, or a copolymer of the monomers constituting the foregoing from the viewpoints of being easy to lower the adhesion to a metal roll during production and being easy to enhance the winding property, the maximum draw ratio, the resistance to folding and the impact strength under low humidity. As the copolymer, a copolymer of ethylene oxide and propylene oxide, a copolymer of ethylene glycol and propylene glycol, and the like are preferable.

The polyoxyalkylene (C) may contain a structural unit derived from a monomer other than the structural unit (2) as long as the effect of the present invention is not impaired. When the polyoxyalkylene (C) is a copolymer, the polymerization mode of the copolymer is not particularly limited, and it may be in a random mode, a block mode, a graft mode, or a tapered mode.

The weight average molecular weight of the polyoxyalkylene (C) is preferably 10,000 or more, more preferably 50,000 or more, and is preferably 5,000,000 or less, and more preferably 3,000,000 or less. When the weight average molecular weight is in the above range, it is easy to enhance the oxygen barrier property, the winding property, the maximum draw ratio, the resistance to folding, and the impact strength under low humidity, and it is easy to lower the adhesion to a metal roll at during production.

As the polyoxyalkylene (C), a commercially available product may be used. Examples of representative commercial products of the polyoxyalkylene (C) include ALKOX (trademark) E-75G, ALKOX (trademark) L-11, ALKOX (trademark) L-6, and ALKOX (trademark) EP1010N manufactured by Meisei Chemical Works, Ltd., PEO (trademark) PEO-1 and PEO-2 manufactured by Sumitomo Seika Chemicals Co., Ltd.

The content of the polyoxyalkylene (C) is 0.1 to 10 parts by mass with respect to 100 parts by mass in total of the components (A), (B), (C) and (D). If the content of the polyoxyalkylene (C) is less than 0.1 parts by mass or more than 10 parts by mass, the adhesion to a metal roll during production tends to increase, and the oxygen barrier property, the winding property, the maximum draw ratio, the resistance to folding, and the impact strength under low humidity tend to decrease.

The content of the polyoxyalkylene (C) is 0.1 part by mass or more, preferably 0.5 part by mass or more, and it is 10 parts by mass or less, preferably 8 parts by mass or less, and more preferably 5 parts by mass or less. When the content of polyoxyalkylene (C) is equal to or higher than the above lower limit, it is easy to lower the adhesion to a metal roll during production and it is easy to enhance the winding property, the maximum draw ratio, the resistance to folding, and the impact strength under low humidity. When the content is equal to or less than the above upper limit, the oxygen barrier property and the impact strength under low humidity tend to be improved.

<Polyol Plasticizer (D)>

The resin composition of the present invention may optionally comprise 0 to 5 parts by mass of a polyol plasticizer (D) with respect to 100 parts by mass in total of the components (A), (B), (C) and (D). That is, the resin composition of the present invention may not comprise the polyol plasticizer (D), or may comprise it in an amount of more than 0 and 5 parts by mass or less. Since the polyol plasticizer (D) can improve the flexibility of the resin composition, it can be used particularly for controlling the hardness and softness. On the other hand, if the content of the polyol plasticizer exceeds 5 parts by mass, the oxygen barrier property, the resistance to folding, the impact strength under low humidity, and the color tone are reduced, and the resin composition can not have sufficient oxygen barrier property, resistance to folding, impact strength under low humidity, and color tone. Moreover, the winding property and the maximum draw ratio tend to lower during the production of a coated product, and the adhesion to a metal roll tends to be enhanced. Accordingly, in the present invention, 0 to 5 parts by mass of the polyol plasticizer (D) may be used, as necessary. Since extrusion forming is possible in the present invention as will be described later, a resin composition can be produced using water or the like as a plasticizer without using a polyol plasticizer.

Examples of the polyol plasticizer (D) include sorbitol, maltitol, glycerol, mannitol, xylitol, erythritol, ethylene glycol, and propylene glycol. The polyol plasticizer (D) can be used singly or two or more species thereof may be used in combination. Among these, sorbitol is preferable from the viewpoint of suppressing lowering of the oxygen barrier property, the resistance to folding, the impact strength under low humidity, and the color tone and simultaneously being likely to impart flexibility.

When the resin composition of the present invention comprises the polyol plasticizer (D), the content thereof is preferably 0.1 part by mass or more and preferably 4 parts by mass or less. When the content of the polyol plasticizer (D) is equal to or more than the above lower limit, it is easy to enhance the flexibility of the resin composition, and when it is equal to or less than the above upper limit, it is easy to enhance the oxygen barrier property, the winding property, the maximum draw ratio, the resistance to folding, the impact strength under low humidity, and the color tone and it is easy to lower the adhesion to a metal roll during production.

<Resin Composition>

Since the resin composition of the present invention comprises 50 to 98 parts by mass of the modified starch (A), 2 to 50 parts by mass of the polyvinyl alcohol (B), 0.1 to 10 parts by mass of the polyoxyalkylene (C), and optionally 0 to 5 parts by mass of the polyol plasticizer (D) with respect to 100 parts by mass in total of the components (A), (B), (C) and (D), it exhibits low adhesion to a metal roll during the production of a coated product and can form a coated product superior in oxygen barrier property and resistance to folding. Furthermore, the winding property and the maximum draw ratio at the time of producing a coated product are also high. That is, the resin composition of the present invention allows a coated product to be produced therefrom at a high conveyance speed, but it does not develop breakage or the like due to its sticking to a metal roll during production. The resin composition can form a coated product that suppresses the penetration of a liquid or the like even after being folded repeatedly and has a high oxygen barrier property. Furthermore, since the resin composition of the present invention comprises the above components (A) to (D) in the prescribed ratios, it can form a film or sheet superior in oxygen barrier property, impact strength under low humidity, and color tone. For this reason, the resin composition of the present invention can form a film or sheet that has a high oxygen barrier property, has a good appearance, and is capable of preventing rupture or the like even if a molded article thereof is impacted during storage under low humidity such as in a refrigerated environment. Thus, the resin composition of the present invention can be suitably used as a material for packaging and containers for food.

The resin composition of the present invention may further comprise a fatty acid having 12 to 22 carbon atoms and/or a fatty acid salt thereof. Examples of the fatty acid having 12 to 22 carbon atoms and a fatty acid salt thereof include stearic acid, calcium stearate, sodium stearate, palmitic acid, lauric acid, myristic acid, linoleic acid, and behenic acid. Among these, stearic acid, calcium stearate, and sodium stearate are preferable from the viewpoint of processability. The fatty acids having 12 to 22 carbon atoms and the fatty acid salts thereof may be used singly or two or more of them may be used in combination.

When the resin composition of the present invention contains a fatty acid having 12 to 22 carbon atoms and/or a fatty acid salt thereof, the content thereof in the resin composition is preferably 0.01 to 3% by mass, more preferably 0.03 to 2% by mass, and even more preferably 0.1 to 1% by mass, with respect to the mass of the resin composition. When the content of the fatty acid having 12 to 22 carbon atoms and/or the fatty acid salt thereof is in the above range, it tends to be advantageous in terms of processability.

The resin composition of the present invention may further comprise clay. Examples of the clay include synthetic or natural layered silicate clays such as montmorillonite, bentonite, beidellite, mica, hectorite, saponite, nontronite, sauconite, vermiculite, ledikite, magadite, kenyaite, stevensite, and volkonskoite. The clays may be used singly or two or more thereof may be used in combination.

When the resin composition of the present invention contains clay, the content thereof in the resin composition is preferably 0.1 to 5% by mass, more preferably 0.1 to 3% by mass, even more preferably 0.5 to 2% by mass, with respect to the mass of the resin composition. When the clay content is in the above range, it tends to be advantageous in terms of transparency, color tone and strength.

The resin composition of the present invention may comprise a plasticizer (E) other than the polyol plasticizer (D). Examples of the plasticizer (E) include water, glycerol trioleate, epoxidized linseed oil, epoxidized soybean oil, tributyl citrate, acetyltriethyl citrate, glyceryl triacetate, and 2,2,4-trimethyl-1,3-pentanediol diisobutyrate. The plasticizers (E) may be used singly or two or more of them may be used in combination. Among these plasticizers (E), water is preferable from the viewpoint of being able to obtain good film-forming property and coating property.

The water content in the resin composition is preferably 3 to 20% by mass, more preferably 4 to 18% by mass, and even more preferably 7 to 15% by mass, with respect to the mass of the resin composition, from the viewpoint of being likely to enhance the film-forming property and the oxygen barrier property of the resin composition. The water content can be determined, for example, by measuring at 130° C. for 60 minutes using a heat-drying moisture meter.

The resin composition of the present invention may further comprise additives such as fillers, processing stabilizers, weather resistance stabilizers, coloring agents, ultraviolet absorbing agents, light stabilizers, antioxidants, antistatic agents, flame-retardants, other thermoplastic resins, lubricants, perfumes, antifoaming agents, deodorants, bulking agents, releasing agents, mold releasing agents, reinforcing agents, crosslinking agents, fungicides, antiseptics, and crystallization rate retardants, as necessary.

In the resin composition of the present invention, the total content of the modified starch (A), the polyvinyl alcohol (B), the polyoxyalkylene (C) and the polyol plasticizer (D) is preferably 60% by mass or more, more preferably 80% by mass or more, even more preferably 85% by mass or more, and further preferably 90% by mass or more with respect to the mass of the resin composition, and is preferably 100% by mass or less. When the total content of the components (A), (B), (C) and (D) is within the above range, it is easy to enhance the oxygen barrier property, the winding property, the maximum draw ratio, the resistance to folding, the impact strength under low humidity, and the color tone and it is easy to lower the adhesion to a metal roll during production.

The resin composition of the present invention may be in the form of a pellet or a film or sheet. When the resin composition of the present invention is used as a film or a sheet, the thickness of the film is commonly 5 to 100 μm, and the thickness of the sheet is commonly 100 μm to 1000 μm. The film or sheet may be a monolayer body or a multilayer body (for example, a laminate described later).

[Method for Producing Resin Composition]

The resin composition of the present invention can be produced by a method comprising at least Step (1) of mixing the modified starch (A), the polyvinyl alcohol (B) and the polyoxyalkylene (C) to obtain a mixture, Step (2) of extruding the mixture (1), and Step (3) of cooling and drying the extruded mixture.

Step (1) is a step of mixing at least the modified starch (A), the polyvinyl alcohol (B) and the polyoxyalkylene (C), and optionally, a polyol plasticizer (D) and/or other components, for example, the aforementioned fatty acid having 12 to 22 carbon atoms and/or a fatty acid salt thereof, the aforementioned clay, the aforementioned plasticizer (E), and the aforementioned additive may be mixed together.

Step (1) is usually performed using an extruder. In the extruder, a shearing stress is applied to each component with a screw, and each component is uniformly mixed while heating by application of the external heat to a barrel.

As the extruder, for example, a twin screw extruder can be used. The twin screw extruder may be co-rotation or reverse rotation. The screw diameter may be, for example, 20 to 150 mm, and the ratio L/D ratio of the extruder length (L) to the screw diameter (D) may be, for example, 20 to 50. The rotation speed of the screw is preferably 80 rpm or more, and more preferably 100 rpm or more. The extrusion pressure is preferably 5 bar (0.5 MPa) or more, and more preferably 10 bar (1.0 MPa) or more. Each component can be introduced directly into the extruder. Further, each of the components may be premixed using a mixer and then introduced into the extruder.

In Step (1), from the viewpoint of being easy to enhance the film-forming property and the oxygen barrier property of the resin composition, it is preferable to mix a plasticizer (E), preferably water, in an amount whose lower limit is preferably 0.1% by mass or more, more preferably 1% by mass or more, even more preferably 10% by mass or more, particularly preferably 15% by mass or more, and most preferably 20% by mass or more with respect to the mass of the mixture and whose upper limit is preferably 50% by mass or less, more preferably 45% by mass or less, and even more preferably 40% by mass or less. Here, the mass of the mixture is the total mass of the mixture including the plasticizer (E). In Step (1), the plasticizer (E) may be introduced into the extruder at an initial stage of extrusion, and the plasticizer (E) can be introduced before the temperature reaches the aforementioned heating temperature, for example, at 100° C. or lower. The modified starch (A) is subjected to the cooking treatment by the combination of the moisture, the heat, and the shearing stress, and can be gelatinized (gelled). Further, by separately introducing the plasticizer (E), preferably water, a water-soluble polymer such as the polyvinyl alcohol (B) is dissolved, the resin composition is softened, and the modulus and the brittleness can be reduced.

In Step (1), cooking treatment is performed by heating to a temperature of preferably higher than 100° C. and 150° C. or lower, and more preferably 115° C. or higher and 140° C. or lower. Here, the cooking treatment is treatment of grinding and gelling starch particles. The heating can be performed by applying heat to the barrel of the extruder from the outside. Each barrel can be heated to a target temperature by applying temperature that is changed stepwise. When the cooking treatment is performed at a temperature higher than 120° C., this is advantageous in terms of processability.

In order to prevent foaming, it is preferable to push the cooked mixture toward a die while cooling it to a temperature of preferably 85 to 120° C., more preferably 90 to 110° C. Further, by exhausting the air from the barrel, foaming can be prevented and the moisture can be removed.

The residence time in the extruder can be set according to the temperature profile and the screw speed, and is preferably 1 to 2.5 minutes.

In Step (2) of extruding the mixture, the molten mixture that has been pushed in the extruder while being melt-kneaded is extruded through the die. The temperature of the die is preferably 85 to 120° C., and more preferably is 90 to 110° C.

In Step (3) of cooling and drying the extruded mixture (melt), the mixture (melt) may be extruded into a film shape, a sheet shape or a strand shape.

When the mixture is extruded into a film shape or a sheet shape, the mixture can be extruded through a die for forming a film or sheet, and then cooled and dried while being wound with a winding roller. It is preferable to cool the mixture between the die and the roller so as to prevent the mixture from adhering to the roller. A shaping roll may be installed between the die and the roller. The material of the shaping roll is, for example, rubber, resin, or metal. For drying, the roll may be warmed or dehumidified air may be supplied during winding. In the case of the blowing-tube method, the dehumidified air can be used in order to inflate the film or sheet when the film or sheet is released from the die. By accompanying talc in the air stream, blocking of the film or sheet can be prevented.

When the mixture is extruded into a strand shape, the mixture is extruded through a multi-hole strand nozzle, and strands are cut with a rotary cutter, so that the strands can be formed into a pellet shape. In order to prevent the pellets from agglutinating, the moisture in the pellets may be removed by applying vibration periodically or regularly and using hot air, dehumidified air or an infrared heater.

[Hydrous Composition]

The present invention includes a hydrous composition comprising the resin composition described above and having a water content of 1 to 50% by mass. In one preferred embodiment of the present invention, when the resin composition is applied to a paper or a film, water is added to the resin composition to prepare a hydrous composition in order to enhance the film-forming property of the resin composition. In the present invention, since the resin composition is constituted with the above-described composition, stickiness due to the addition of water can be suppressed, the winding property at the time of producing a coated product, the maximum draw ratio and the resistance to folding can be improved, and the adhesion to a metal roll can be reduced. The water content can be determined by measuring at 130° C. for 60 minutes using a heat-drying moisture meter, and can be measured by, for example, the method described in Examples. In the present description, it is meant that the hydrous composition includes all of the resin compositions containing water having a water content of 1 to 50% by mass measured by the above method. That is, the hydrous composition may be prepared by adding water to the produced resin composition, and if the water content of a resin composition itself is within the above range at the time when the resin composition is produced, the resin composition is included in the concept of the hydrous composition. In other words, even when a resin composition contains water, it is included in the concept of the resin composition, and among such resin compositions, a resin composition whose water content is specified to 1 to 50% by mass is referred to as a hydrous composition.

The water content of the hydrous composition of the present invention is preferably 5% by mass or more, and more preferably 8% by mass or more, and is preferably 45% by mass or less, and more preferably 40% by mass or less. When the water content is in the above range, it is easy to enhance the oxygen barrier property, the winding property, the maximum draw ratio and the resistance to folding, and it is easy to lower the adhesion to a metal roll during production.

In a preferred embodiment of the present invention, the hydrous composition of the present invention can be prepared by adding water to the resin composition described above and, for example, stirring and mixing the mixture. In order to prevent the resin compositions from agglutinating to each other and to adsorb water to the entire pellet, it is preferable to perform stirring while adding water in two or more portions. Further, in order to keep the water content constant, the hydrous composition may be stored in a closed container.

[Coated Product and Method for Production Thereof]

The present invention includes a coated product in which a paper or a film is coated with the hydrous composition of the present invention. Although the coated product of the present invention is superior in oxygen barrier property and biodegradability, it can achieve both high winding property during production and low adhesion to a metal roll, which are originally difficult to achieve simultaneously, and further is superior in resistance to folding. Consequently, the coated product of the present invention is high in releasability from a metal roll, and can be produced at a high conveyance speed while suppressing breakage or the like of the coated product due to sticking to a metal roll, so that the yield rate and the production efficiency can be improved.

When the hydrous composition is applied to a paper, the paper is not particularly limited, and examples thereof include kraft paper, woodfree paper, simili paper, glassine paper, parchment paper, synthetic paper, white paperboard, manila board, milk carton paper, cup base paper, ivory paper, silver-white paper, thin paper, paperboard, and rayon paper. The thickness of the paper in the coated product is not particularly limited, and is preferably 1 to 500 μm, and more preferably 10 to 300 μm. When the thickness of the paper in the coated product is in the above range, the winding speed at the time of producing the coated product can be increased and the productivity tends to be improved.

When the hydrous composition is applied to a film, the film is not particularly limited and examples thereof include polyethylene terephthalate (PET) film, biaxially oriented polypropylene (BOPP) film, polyethylene (PE) film (preferably low density polyethylene (LDPE) film), and polylactic acid film. The thickness of the film in the coated product is not particularly limited, and is preferably 1 to 500 μm, more preferably 10 to 300 μm, and even more preferably 50 to 100 μm.

The thickness of the hydrous composition in the coated product of the present invention is preferably 1 to 300 μm, more preferably 5 to 100 μm, and even more preferably 10 to 50 μm. When the thickness of the resin composition in the coated product is in the above range, a good film-forming property and a good oxygen barrier property tend to be obtained, and it is easy to suppress the sticking of the resin composition to a metal roll during production.

The maximum draw ratio at the time of producing the coated product of the present invention, that is, the maximum draw ratio of the hydrous composition is preferably 5 or more, more preferably 8 or more, even more preferably 10 or more, and is preferably 30 or less, more preferably 25 or less, and even more preferably 20 or less. When the maximum draw ratio is in the above range, a coated product superior in adhesion between a paper or a film and the hydrous composition, oxygen barrier property, and resistance to folding can be obtained with high productivity. The maximum draw ratio is expressed by the following formula.

$$(\text{Maximum draw ratio})=(\text{Maximum winding speed})/(\text{Flow rate at the die outlet of the extruder})$$

$$(\text{Flow rate at the die outlet of the extruder})=(\text{Discharge amount})/((\text{Lip opening})\times(\text{Die width}))$$

When a paper or a film conveyed by a winding device is coated with a hydrous composition discharged through the die outlet of the extruder, the conveyance speed (winding speed) of the paper or the film is increased by 1.0 m/min under a fixed discharge amount, and the maximum winding speed is the maximum speed at which a melt curtain of the hydrous composition does not rupture from edge portion even after being held for 10 seconds. The discharge amount of the hydrous composition through the die outlet of the extruder, the lip opening and the die width may be appropriately adjusted. The maximum draw ratio can be determined by measuring, for example, by the method described in Examples. Since the maximum draw ratio varies depending on the characteristics of the hydrous composition, it can be said to be a specific parameter of the hydrous composition.

Here, the units of the items described in the above formula are (maximum winding speed) [m/s], (flow rate at the die outlet of the extruder) [m/s], (discharge amount) [$m^3$/s], (lip opening) [m], (die width) [m], and (maximum draw ratio) [unitless].

The oxygen permeability (mL·20 μm/$m^2$·atm·24 hr) of the coated product of the present invention at 23° C. and 50% RH is preferably 5.0 or less, more preferably 4.0 or less, even more preferably 3.0 or less, and particularly preferably 2.5 or less. When the oxygen permeability of the coated product is equal to or less than the above upper limit, a superior oxygen barrier property can be exhibited. The oxygen permeability (mL·20 μm/$m^2$·atm·24 hr) is usually 0.1 or more. The oxygen permeability of a coated product can be measured with an oxygen permeation analyzer after storing the coated product at 23° C. and 50% RH for two weeks to adjust the humidity, and can be measured, for example, by the method described in Examples. In the present description, the expression that the oxygen barrier property is improved or enhanced means that the oxygen permeability is reduced, and the expression that an item is superior in oxygen barrier property means that the item is low in oxygen permeability.

The coated product of the present invention is superior in resistance to folding. The resistance to folding is the characteristic that, when a coated product is folded, the penetration of a liquid or the like from the folded part is suppressed; for example, when a sequence of folding, roll passing, and opening is taken as one set, the resistance to folding can be evaluated using the maximum number of sets with which no penetration of a dye to a paper surface occurs. When a film is coated with the hydrous composition, the resistance to folding can be evaluated by the penetration of a dye to a film surface. In one embodiment of the present invention, the maximum number of sets of the coated product of the present invention is preferably 5 or more, more preferably 6 or more, even more preferably 7 or more, and particularly preferably 8 or more. When the maximum number of sets is equal to or more than the above lower limit, the coated product is superior in resistance to folding.

The method for producing the coated product of the present invention is not particularly limited as long as a paper or a film can be coated with a hydrous composition. In a preferred embodiment, the coated product of the present invention can be produced by a method comprising a step of coating a film or a paper conveyed by a winding device with the hydrous composition by using an extruder (this step is referred to as Step (A)).

In one embodiment of the present invention, the hydrous composition is charged into the extruder in Step (A). Examples of the extruder include a single screw extruder and a twin screw extruder. The screw diameter of the extruder is, for example, 20 to 150 mm, the ratio L/D ratio of the extruder length (L) to the screw diameter (D) is, for example, 15 to 50, and the rotation speed of the screw is preferably 80 rpm or more, and more preferably 100 rpm or more. The cylinder temperature in the extruder may be, for example, 80 to 120° C., and preferably 90 to 110° C.

The hydrous composition charged into the extruder is plasticized and discharged through a die outlet. A paper or a film is conveyed by a winding device, preferably a roller type winding device. By coating the conveyed paper or film with the hydrous composition discharged through the die outlet, a coated product is obtained. The resulting coated product is conveyed while being pressure-bonded to a paper or a film between a plurality of rolls including a metal roll, and can be wound into a roll form by a winding device. Examples of the plurality of rolls include pressure rolls, cast rolls, and touch rolls, and usually, the cast rolls are metal rolls (rolls made of metal). In the present invention, since the adhesion between the applied hydrous composition and a metal roll is low, the releasability from the metal roll is high, so that the hydrous composition in the coated product can be effectively prevented from breaking or the like due to sticking to the metal roll. The adhesion of the coated product to a metal roll can be evaluated by determining the adhesion force of a hydrous sheet coated with a waterproof paper on one side to the metal as described in Examples. In the present description, "coating" is sometimes expressed as "coat".

In the step (A), the draw ratio represented by the following Formula (1) is preferably 5 to 20. When a coated product is produced with such a draw ratio, the productivity is improved and a coated product superior in adhesion between a paper or a film and a hydrous composition as well as in oxygen barrier property tends to be obtained. The flow rate at the die outlet of the extruder is represented by (discharge amount)/((lip opening)×(die width)) as described above. When the discharge amount is expressed by the mass per unit time, the discharge amount is preferably 1 to 500 kg/hr, and more preferably 5 to 200 kg/hr, and the lip opening is preferably 0.01 to 5 mm, and more preferably 0.1 to 1 mm, and the die width is preferably 100 to 3000 mm, and more preferably 200 to 2000 mm. In the present invention, since the water of the hydrous composition evaporates during the above-described production process, the water content of the hydrous composition in the resulting coated product is reduced as compared with that before the production.

Draw ratio=(Winding speed of the winding device)/(Flow rate at the die outlet of the extruder) (1)

[Multilayer Structure and Packaging Material Including the Coated Product]

The present invention includes a multilayer structure comprising the coated product and one or more layers (X). Examples of the layer (X) include film, paper, and adhesive. When there are two or more layers (X), the layers (X) may be the same or different. While the multilayer structure of the present invention has two or more layers (X), the number of the layers is not particularly limited and may be, for example, 3 to 10 layers. Examples of the film and the paper include the films and the papers disclosed in the section [Coated Product and Method for Production Thereof], respectively.

Examples of the adhesive that may be contained in the multilayer structure include acrylic adhesives, urethane-based adhesives, epoxy-based adhesives, vinyl acetate-based adhesives, ethylene-vinyl acetate-based adhesives, vinyl chloride-based adhesives, silicone-based adhesives, nitrile cellulose-based adhesives, phenol-based adhesives, polyvinyl alcohol-based adhesives, melamine-based adhesives, and styrene-based adhesives.

In a preferred embodiment of the present invention, the multilayer structure has a layered structure laminated in the order of film/adhesive/hydrous composition/paper/adhesive/ film. In this embodiment, the type of the films or paper is not particularly limited, but the film is preferably a polyethylene film.

The present invention includes a packaging material comprising the coated product or the multilayer structure of present invention. The packaging material is superior in oxygen barrier property, adhesion between the hydrous composition and a paper or a film, biodegradability, and resistance to folding, so that it can be suitably used as a packaging material for foods.

[Film or Sheet Comprising Resin Composition and Laminate Comprising the Film or Sheet]

The present invention includes a film or a sheet comprising a resin composition (sometimes referred to as a resin composition film or a resin composition sheet). As described above, the film or sheet of the present invention is superior in oxygen barrier property, impact strength under low humidity, and color tone.

In one embodiment of the invention, the oxygen permeability of the film or sheet of the invention at 23° C. and 50% RH can be selected from the same range as the oxygen permeability of the coated product described above. The meaning and measuring method of the oxygen permeability are the same as those of the oxygen permeability in the coated product.

In one embodiment of the present invention, the impact strength of the film or sheet of the present invention under low humidity is preferably 13 mN/μm or more, more preferably 15 mN/μm or more, even more preferably 18 mN/μm or more, and particularly preferably 20 mN/μm or more. When the impact strength under low humidity is equal to or higher than the above lower limit, the film or sheet is superior in impact strength under low humidity and is unlikely to develop breakage or the like due to impact. The impact strength under low humidity can be measured by using a film impact tester after storing the film or sheet at 20° C. and 33% RH for two weeks, and can be measured by, for example, the method described in Examples.

In one embodiment of the present invention, the b value (yellow index, YI) of the film or sheet of the present invention is preferably 18 or less, more preferably 15 or less, even more preferably 13 or less, and is preferably-10 or more. When the b value is equal to or less than the above upper limit, the yellowness of the film or sheet is reduced and the color tone tends to be improved. The b value can be measured using a color meter after storing the film or sheet at 23° C. and 50% RH for two weeks, and can be measured by, for example, the method described in Examples.

The method for producing the film or sheet of the present invention is not particularly limited, and examples thereof include a method of obtaining a film or sheet from the resin composition described in the section [Method for Producing Resin Composition].

The present invention includes a laminate comprising a film or sheet and one or more layers (X). As the layer (X), for example, the same layer (X) as that described in the section [Multilayer Structure and Packaging Material Including the Coated product] can be used. In a preferred embodiment of the present invention, the laminate preferably has, for example, a layer configuration laminated in the order of resin composition film or sheet/adhesive layer/substrate layer. The adhesive layer comprises an adhesive and the substrate layer comprises, for example, a film.

While the method for producing the laminate of the present invention is not particularly limited, it is preferably produced by lamination. For example, when the laminate is a laminate having a resin composition film or sheet/an adhesive layer/a substrate layer in this order, there may be used a method comprising a step of co-extruding the adhesive layer and the substrate layer, and a step of subsequently coating the adhesive layer side with the resin composition film or sheet. Other methods include, for example, a method comprising a step of extruding the adhesive layer and a step of subsequently inserting the adhesive layer between the resin composition film or sheet and the substrate layer and a method comprising a step of applying a solution or dispersion of the adhesive to a resin composition film or sheet or a substrate layer with a gravure roll or the like and then drying, and a step of subsequently bringing the adhesive layer side into tight contact with another resin composition film or sheet or substrate layer on which no adhesive has been applied.

In one embodiment of the present invention, in the step of co-extruding the adhesive layer and the substrate layer, for example, two-kind two-layer co-extrusion cast film forming equipment (an extruder manufactured by Research Laboratory of Plastics Technology Co., Ltd.) (extruder (1) for the substrate layer: single screw, screw diameter=40 mm, L/D=32, extruder (2) for the adhesive layer: single screw, screw diameter=32 mm, L/D=26) may be used. The temperature condition of the extruder may be appropriately set according to the thermoplastic resin to be used. For example, when PET (polyethylene terephthalate) is extruded with the extruder (1) for the substrate layer, the cylinder temperature may be 250 to 270° C., the adapter temperature may be 270° C., and the die temperature may be 275° C.

Further, for example, when polyolefin is extruded with the extruder (2) for the adhesive layer, the cylinder temperature may be adjusted to 175 to 270° C., the adapter temperature may be 270° C., and the die temperature may be 275° C. Further, the absolute value of the difference between the die temperature of the extruder (1) and the die temperature of the extruder (2) is preferably within 10° C., and more preferably 0° C. For example, when the optimum die temperature differs between the resin to be used for the extruder (1) and the resin to be used for the extruder (2), it is preferable to adjust the die temperature by employing the one with the higher optimum die temperature.

In the step of subsequently coating the adhesive layer side with the resin composition film or sheet, for example, there may be employed a method involving applying the adhesive layer side of the co-extruded laminate onto the resin composition film or sheet while winding the laminate, and bonding them together with a nip roll. The winding speed is preferably 1 to 10 m/min. Although a preferred extruder is described above, the type, the screw diameter, and L/D of the extruder can be changed as appropriate.

[Packaging Container and Method for Production Thereof]

The present invention includes a packaging container comprising the film or sheet of the present invention or the laminate of the present invention, especially, a packaging tray or cup. The packaging container may consist of only the laminate of the present invention, or alternatively may be one in which other materials are combined. For example, the laminate of the present invention may be thermoformed into a packaging container.

In one embodiment of the present invention, the packaging container of the present invention, especially, the packaging tray or cup, can be produced by a method comprising a step of obtaining a film or sheet by shaping the resin composition described above by using an extruder, a step of obtaining a laminate by laminating the resulting film or sheet and one or more layers (X) together by lamination, and a step of thermoforming the resulting laminate into a packaging tray or cup.

As the step of obtaining a film or sheet by shaping the resin composition described above by using an extruder, for example, the method of shaping a film or sheet described in the above section [Method for Producing Resin Composition] may be used. The step of obtaining a laminate by laminating the resulting film or sheet and one or more layers (X) together by lamination may be, for example, the method for producing a laminate described in the above section [Film or Sheet Comprising Resin Composition and Laminate Comprising the Film or Sheet].

In the step of thermoforming a laminate into a packaging tray or cup, the method of thermoforming is not particularly limited, and examples thereof include common vacuum forming and pressure forming, and as application thereof, a plug-assist method, in which a laminate is molded with a plug kept in contact with one side of the laminate, and so-called multi-mold forming, in which a laminate is molded with a pair of male and female molds kept in contact with both sides of the laminate. The method of heating and softening the laminate before molding may be non-contact heating or direct heating, and the non-contact heating may be radiant heating with an infrared heater or the like. As the direct heating, known heating methods such as hot plate heating in which the laminate is brought into direct contact with a hot plate can be applied.

The packaging container of the present invention is superior as a packaging container because its impact strength is maintained even when it is stored under low humidity. In a more preferred embodiment, it can be particularly suitably used as a packaging container for foods because it is superior in oxygen barrier property and color tone.

EXAMPLES

The present invention is described in detail by way of Examples, but the present invention is not limited to them.

<Test Method>

(1) Measurement of Maximum Draw Ratio

The hydrous pellets 1 obtained in Examples and Comparative Examples were put into the single screw extruder 2 shown in FIG. 1 and then extruded through the film-forming die 3. Next, the hydrous composition 4 extruded through the outlet of the die 3 was applied to a paper 5 conveyed by a roller type winding device (not shown). The coated product 6 obtained by coating was immediately pressed against the paper 5 (substrate) through a pressure roll (made of rubber) 7*a*, a cast roll (made of metal) 7*b*, and a touch roll (made of rubber) 7*c*, and then wound into a roll form with a winding device (not shown). Details of the single screw extruder used and its operation conditions and the temperature profile (Table 1) are shown below.

Single screw extruder: extruder manufactured by Research Laboratory of Plastics Technology Co., Ltd. (40 mm in diameter, L/D=25)

Preset Temperature:

TABLE 1

| Single screw extruder cylinder | | | | | |
|---|---|---|---|---|---|
| C1 | C2 | C3 | C4 | Adapter | Die |
| 100° C. | 100° C. | 100° C. | 100° C. | 100° C. | 100° C. |

Discharge Amount: 20 kg/hr

Die: 450 mm wide coat hanger die, lip opening=0.2 mm

Distance between Die and Cast Roll (Air Gap): 150 mm

Paper: Hakugin manufactured by Nippon Paper Industries Co., Ltd. (uncoated paper, thickness=70 μm)

Under a fixed discharge amount, the paper conveyance speed was increased from 1.0 m/min by 1.0 m/min step, and the maximum speed at which the melt curtain did not tear from an edge even after holding for 10 seconds was recorded as the maximum winding speed. The maximum draw ratio was calculated based on the following formula.

$$(\text{Maximum draw ratio})=(\text{Maximum winding speed})/(\text{Flow rate at the die outlet of the extruder})$$

$$(\text{Flow rate at the die outlet of the extruder})=(\text{Discharge amount})/((\text{Lip opening})\times(\text{Die width}))$$

When the maximum draw ratio is 5 or more, this can be evaluated as good.

(2) Measurement of Oxygen Permeability

The coated products and sheets obtained in Examples and Comparative Examples were each stored at 23° C. and 50% RH for two weeks to adjust the humidity, and then mounted to an oxygen permeation analyzer, and the oxygen permeability was measured. The measurement conditions are as follows.

Instrument: "MOCON OX-TRAN2/20" manufactured by Modern Controls, Inc.

Temperature: 23° C.

Humidity on oxygen supply side and carrier gas side: 50% RH

Oxygen pressure: 1.0 atm

Carrier gas pressure: 1.0 atm

When the oxygen permeability is 5 (mL·20 μm/$m^2$·atm·24 hr) or less, it can be evaluated that the oxygen barrier property is good.

(3) Adhesion Force between Hydrous Sheet and Metal

The adhesion of a coated product to a metal roll during production was evaluated in accordance with the following method.

The hydrous pellets obtained in Examples and Comparative Examples were extruded through a film-forming die using a single screw extruder, and then the extrudate was wound in a roll form using a winding device while being sandwiched between waterproof papers conveyed by a roller type winding device, and thus a hydrous sheet was prepared. The moisture content of the hydrous sheet was measured at 130° C. for 60 minutes using a heat-drying moisture meter "HR73" manufactured by METTLER TOLEDO and thereby confirmed to be 28% by mass or more and less than 32% by mass.

From the hydrous sheet with a water content maintained by being sandwiched between waterproof papers, one of the waterproof papers was peeled off, and the resultant was immediately attached firmly to a chromium-plated metal plate and then pressed at a temperature of 95° C. and a pressure of 50 kg/$cm^2$ for 60 seconds. With both sides attached to the metal plate and the waterproof paper, the hydrous sheet was left stand at 20° C. for 3 minutes to cool, and then the hydrous sheet coated with the waterproof paper on one side was cut on the metal plate into a strip shape with a width of 15 mm and a length of 10 cm.

Next, a strip-shaped sheet having a width of 15 mm and a length of 10 cm was peeled off from a 3 cm metal plate, inserted in a chuck of a tensile tester, and then it was peeled off from the metal plate at an angle of 90° and the load applied at this time was measured.

Waterproof paper: TGB70 brown manufactured by Sun A. Kaken Co., Ltd. (silicone-coated paper, thickness=70 μm)

Metal plate: mirror-finished metal plate prepared by applying chromium plating in accordance with JIS H8615 in a thickness of 50 μm or more to a 100×100 mm SUS plate with a thickness of 5 mm, center line average roughness (Ra)=0.04 μm Press machine: "180C" manufactured by Imoto machinery Co., Ltd.

Tensile tester: "INSTRON3367" manufactured by Instron, load cell: 500 N

When the adhesion force between a hydrous sheet coated with a waterproof paper on one side and metal is 3 N/15 mm or less, the adhesion of a coated product to a metal roll can be evaluated as low.

(4) Method for Measuring Viscosity of Polyvinyl Alcohol (B)

In accordance with JIS Z 8803 (falling ball viscometer) and JIS K 6726 (testing methods for polyvinyl alcohol), a 4% aqueous solution of each of the polyvinyl alcohols in Examples and Comparative Examples was prepared and its viscosity at 20° C. was measured using a Hoppler viscometer and was taken as the viscosity (20° C.) in a 4% aqueous solution of the polyvinyl alcohol (B).

(5) Method for Evaluating Resistance to Folding

The coated products obtained in Examples and Comparative Examples were stored at 23° C. and 50% RH for two weeks, and the coated paper was cut into a 10×10 cm section. The section was folded with the resin surface facing inward such that the area was bisected, and a 2 kg rubber roll (width: 45 mm, rubber hardness: 80 Hs, No. 450 rubber roller manufactured by Taiyu Kizai Co., Ltd.) was passed on the paper surface of the folded part at a speed of 50 mm/sec, and then the folded part was opened to be flat. The folding, roll passing, and opening were repeated. A toluene-heptane mixed solution (toluene:heptane=45:55, volume ratio) in which Sudan IV dye was dissolved at a concentration of 0.1% by weight was dropped onto the resin surface of the opened folded part, and after 10 seconds had passed, penetration of the dye to the paper surface was visually evaluated. A sequence of folding, roll passing, and opening was taken as one set, and the maximum number of sets with which no penetration of a dye to a paper surface occurred was used as the evaluation index for resistance to folding.

(6) Method for Evaluating Color Tone (b value)

The sheets obtained in Examples and Comparative Examples were stored at 23° C. and 50% RH for two weeks, then cut into 10×10 cm sections, and subjected to the measurement of b value (yellowness, YI) using a color meter "ZE 2000" manufactured by Nippon Denshoku Industries Co., Ltd.

(7) Method for Evaluating Impact Strength under Low Humidity

The sheets obtained in Examples and Comparative Examples were stored at 20° C. and 33% RH for 2 weeks, then cut into 10×10 cm sections, and subjected to the measurement of impact strength using a film impact tester manufactured by Toyo Seiki Seisaku-sho, Ltd.

(8) Materials Used

<High Amylose-Modified Starch (A-1)>

ECOFILM (trademark): corn starch modified with propylene oxide, amylose content=70% by mass, manufactured by Ingredion Inc.

<Low Amylose-Modified Starch (A-2)>

National 1658 (trademark): corn starch modified with propylene oxide, amylose content=20% by mass, manufactured by Ingredion Inc.

<Polyvinyl Alcohol (B)>

ELVANOL (trademark) 71-30: polyvinyl alcohol resin, degree of saponification=99 mol % or more, viscosity=27-33 mPa·s (20° C., 4% aqueous solution), manufactured by Kuraray Co., Ltd.

Kuraray Poval (trademark) 5-98: polyvinyl alcohol resin, degree of saponification=98 mol %, viscosity=5 mPa·s (20° C., 4% aqueous solution), manufactured by Kuraray Co., Ltd.

Kuraray Poval (trademark) 5-88: polyvinyl alcohol resin, degree of saponification=88 mol %, viscosity=5 mPa·s (20° C., 4% aqueous solution), manufactured by Kuraray Co., Ltd.

Kuraray Poval (trademark) 3-98: polyvinyl alcohol resin, degree of saponification=98 mol %, viscosity=3 mPa·s (20° C., 4% aqueous solution), manufactured by Kuraray Co., Ltd.

<Polyoxyalkylene (C)>

ALKOX (trademark) E-75G: polyethylene oxide resin, weight average molecular weight=2,000,000, manufactured by Meisei Chemical Works, Ltd.

ALKOX (trademark) L-11: polyethylene oxide resin, weight average molecular weight=100,000, manufactured by Meisei Chemical Works, Ltd.

ALKOX (trademark) L-6: polyethylene oxide resin, weight average molecular weight=60,000, manufactured by Meisei Chemical Works, Ltd.

ALKOX (trademark) EP1010N: polyethylene oxide-polypropylene oxide random copolymer resin, weight average molecular weight=100,000, manufactured by Meisei Chemical Works, Ltd.

<Polyol Plasticizer (D)>

Sorbitol SP: sorbitol, manufactured by B Food Science Co., Ltd.

<Clay>

CLOISITE (registered trademark) 20A: natural montmorillonite modified with dimethyldi (hydrogenated tallow) quaternary ammonium chloride, manufactured by Southern Clay Industries.

Example 1

(Resin Composition)

ECOFILM (trademark) (7.28 kg), National 1658 (2.43 kg), Kuraray Poval (trademark) 5-98 (200 g), and ALKOX (trademark) L-11 (100 g) were mixed as raw materials in a tumbler mixer for 2 hours, and the resulting mixture was fed to a twin screw extruder connected to a liquid pump. FIG. 2 shows a schematic view of the twin screw extruder used in Example 1, and the screw diameter, the L/D ratio, the rotation speed, the operation mode, and the temperature profile (Table 2) of the extruder are shown below.

TABLE 2

| Temperature profile A [° C.]: | | | | | | | | | | | | |
|---|---|---|---|---|---|---|---|---|---|---|---|---|
| C1 | C2 | C3 | C4 | C5 | C6 | C7 | C8 | C9 | C10 | C11 | Adapter | Die |
| 40 | 70 | 80 | 90 | 120 | 140 | 130 | 120 | 120 | 100 | 100 | 100 | 100 |

Screw diameter: 27 mm

L/D ratio: 48

Screw rotation speed: 500 rpm

Operation mode: co-rotation (engaging self-wiping) mode

Specifically, the resulting mixture was fed at a rate of 3.5 kg/hour into the barrel through the hopper at Cl via the weight feeder of the twin screw extruder. Water was injected at a flow rate of 26 g/min into the barrel through the liquid pump (L) at C4. The temperature ranges of C5 to C9 are cooking ranges, and complete gelatinization was completed within these ranges. The strand die is positioned after C11. The resin composition was extruded through a multi-hole strand nozzle and cut with a rotary cutter. Thus, strands were formed into a pellet shape. Since the pellets contained excess water, the water was removed by hot air while constantly applying vibration in order to prevent agglutinating.

(Hydrous Composition)

To the resulting pelletized resin composition was added water up to an amount of 35% by mass with respect to the mass of the resin composition. At the time of the addition of the water, in order to prevent the pellets from agglutinating to each other and to allow the pellets to absorb water uniformly, the mixture was stirred with a tumbler mixer for 15 minutes while adding the water in multiple portions. After the stirring, the mixture was sealed in a polyethylene bag such that water would not volatilize, and was allowed to stand at room temperature for 6 hours. In this way, a hydrous composition (hydrous pellets) having a water content of 35% by mass was obtained. The water content was confirmed by measuring at 130° C. for 60 minutes using a heat-drying moisture meter “HR73” manufactured by METTLER TOLEDO.

(Coated Product)

Using the resulting hydrous pellets, there was prepared a coated product in which a paper was coated with a hydrous composition in a coat thickness of 20 μm at the maximum draw ratio by using the same method as described above in [(1) Measurement of Maximum Draw Ratio].

Example 2

A resin composition, a hydrous composition, and a coated product were obtained in the same manner as in Example 1 except that ECOFILM (trademark) (6.68 kg), National 1658 (2.23 kg), Kuraray Poval (trademark) 5-98 (1.00 kg) and ALKOX (trademark) L-11 (100 g) were used as raw materials.

Example 3

A resin composition, a hydrous composition, and a coated product were obtained in the same manner as in Example 1 except that ECOFILM (trademark) (5.18 kg), National 1658 (1.73 kg), Kuraray Poval (trademark) 5-98 (3.00 kg) and ALKOX (trademark) L-11 (100 g) were used as raw materials.

Example 4

A resin composition, a hydrous composition, and a coated product were obtained in the same manner as in Example 2 except that ELVANOL (trademark) 71-30 was used as the polyvinyl alcohol (B).

Example 5

A resin composition, a hydrous composition, and a coated product were obtained in the same manner as in Example 2 except that Kuraray Poval (trademark) 3-98 was used as the polyvinyl alcohol (B).

Example 6

A resin composition, a hydrous composition, and a coated product were obtained in the same manner as in Example 2 except that Kuraray Poval (trademark) 5-88 was used as the polyvinyl alcohol (B).

Example 7

A resin composition, a hydrous composition, and a coated product were obtained in the same manner as in Example 1 except that ECOFILM (trademark) (6.74 kg), National 1658 (2.25 kg), Kuraray Poval (trademark) 5-98 (1.00 kg) and ALKOX (trademark) L-11 (10 g) were used as raw materials.

Example 8

A resin composition, a hydrous composition, and a coated product were obtained in the same manner as in Example 1 except that ECOFILM (trademark) (6.00 kg), National 1658 (2.00 kg), Kuraray Poval (trademark) 5-98 (1.00 kg) and ALKOX (trademark) L-11 (1.00 kg) were used as raw materials.

Example 9

A resin composition, a hydrous composition, and a coated product were obtained in the same manner as in Example 2 except that ALKOX (trademark) L-6 was used as the polyoxyalkylene (C).

Example 10

A resin composition, a hydrous composition, and a coated product were obtained in the same manner as in Example 4 except that ALKOX (trademark) E-75G was used as the polyoxyalkylene (C).

Example 11

A resin composition, a hydrous composition, and a coated product were obtained in the same manner as in Example 1 except that ECOFILM (trademark) (6.45 kg), National 1658

(2.15 kg), ELVANOL (trademark) 71-30 (1.00 kg), ALKOX (trademark) E-75G (100 g) and Sorbitol SP (300 g) were used as raw materials.

Example 12

A resin composition, a hydrous composition, and a coated product were obtained in the same manner as in Example 2 except that ALKOX (trademark) EP1010N was used as the polyoxyalkylene (C).

Comparative Example 1

A resin composition, a hydrous composition, and a coated product were obtained in the same manner as in Example 1 except that ECOFILM (trademark) (6.75 kg), National 1658 (2.25 kg) and Kuraray Poval (trademark) 5-98 (1.00 kg) were used as raw materials.

Comparative Example 2

A resin composition, a hydrous composition, and a coated product were obtained in the same manner as in Example 1 except that ECOFILM (trademark) (7.43 kg), National 1658 (2.48 kg) and ALKOX (trademark) L-11 (100 g) were used as raw materials.

Comparative Example 3

A resin composition, a hydrous composition, and a coated product were obtained in the same manner as in Example 1 except that ECOFILM (trademark) (6.75 kg), National 1658 (2.25 kg), Kuraray Poval (trademark) 5-98 (1.00 kg) and ALKOX (trademark) L-11 (5 g) were used as raw materials.

Comparative Example 4

A resin composition, a hydrous composition, and a coated product were obtained in the same manner as in Example 1 except that ECOFILM (trademark) (5.63 kg), National 1658 (1.88 kg), Kuraray Poval (trademark) 5-98 (1.00 kg) and ALKOX (trademark) L-11 (1.50 kg) were used as raw materials.

Comparative Example 5

A resin composition, a hydrous composition, and a coated product were obtained in the same manner as in Example 1 except that ECOFILM (trademark) (5.93 kg), National 1658 (1.98 kg), Kuraray Poval (trademark) 5-98 (1.00 kg), ALKOX (trademark) L-11 (100 g) and Sorbitol SP (1.00 kg) were used as raw materials.

The content of a modified starch (A) and its average amylose content, the degree of saponification, the viscosity (20° C.) in a 4% aqueous solution, and the content of a polyvinyl alcohol (B), the brand, the weight average molecular weight, and the content of a polyoxyalkylene (C), the content of a polyol plasticizer (D) as well as the maximum draw ratio of a resin composition, the oxygen permeability of a coated product, the adhesion of a hydrous sheet to metal, and the measurement of the maximum number of folded sets of a coated product are shown in Table 3.

TABLE 3

| | Modified starch (A) | | Polyvinyl alcohol (B) | | | Polyoxyalkylene (C) | | |
|---|---|---|---|---|---|---|---|---|
| | Average amylose content (mass %) | Content (mass %) | Degree of saponification (mol %) | Viscosity (mPa · s) | Content (mass %) | Brand | Weight-average molecular weight | Content (mass %) |
| Example 1 | 57.5 | 97 | 98 | 5 | 2 | L-11 | 100,000 | 1 |
| Example 2 | 57.5 | 89 | 98 | 5 | 10 | L-11 | 100,000 | 1 |
| Example 3 | 57.5 | 69 | 98 | 5 | 30 | L-11 | 100,000 | 1 |
| Example 4 | 57.5 | 89 | 99.0-99.8 | 27-33 | 10 | L-11 | 100,000 | 1 |
| Example 5 | 57.5 | 89 | 98 | 3 | 10 | L-11 | 100,000 | 1 |
| Example 6 | 57.5 | 89 | 88 | 5 | 10 | L-11 | 100,000 | 1 |
| Example 7 | 57.5 | 89.9 | 98 | 5 | 10 | L-11 | 100,000 | 0.1 |
| Example 8 | 57.5 | 80 | 98 | 5 | 10 | L-11 | 100,000 | 10 |
| Example 9 | 57.5 | 89 | 98 | 5 | 10 | L-6 | 60,000 | 1 |
| Example 10 | 57.5 | 89 | 99.0-99.8 | 27-33 | 10 | E-75G | 2,000,000 | 1 |
| Example 11 | 57.5 | 86 | 99.0-99.8 | 27-33 | 10 | E-75G | 2,000,000 | 1 |
| Example 12 | 57.5 | 89 | 98 | 5 | 10 | EP1010N | 100,000 | 1 |
| Comparative Example 1 | 57.5 | 90 | 98 | 5 | 10 | — | — | 0 |
| Comparative Example 2 | 57.5 | 99 | — | — | 0 | L-11 | 100,000 | 1 |
| Comparative Example 3 | 57.5 | 89.95 | 98 | 5 | 10 | L-11 | 100,000 | 0.05 |
| Comparative Example 4 | 57.5 | 75 | 98 | 5 | 10 | L-11 | 100,000 | 15 |
| Comparative Example 5 | 57.5 | 79 | 98 | 5 | 10 | L-11 | 100,000 | 1 |

| | Polyol plasticizer (D) Content (mass %) | Maximum draw ratio | Oxygen permeability (mL · 20 μm/m$^2$ · atm · 24 hr) 23° C., 50% RH | Adhesion to metal (N/15 mm) | Resistance to folding (maximum number of sets) |
|---|---|---|---|---|---|
| Example 1 | 0 | 9 | 3.2 | 1.5 | 6 |
| Example 2 | 0 | 12 | 2.8 | 1.8 | 7 |

TABLE 3-continued

| | | | | | |
|---|---|---|---|---|---|
| Example 3 | 0 | 12 | 0.8 | 2.2 | 10 |
| Example 4 | 0 | 8 | 1.9 | 1.5 | 8 |
| Example 5 | 0 | 12 | 2.6 | 1.6 | 7 |
| Example 6 | 0 | 11 | 2.8 | 1.4 | 7 |
| Example 7 | 0 | 11 | 2.9 | 2.5 | 6 |
| Example 8 | 0 | 11 | 3.8 | 1.4 | 8 |
| Example 9 | 0 | 11 | 2.1 | 1.6 | 7 |
| Example 10 | 0 | 10 | 2.8 | 1.8 | 7 |
| Example 11 | 3 | 10 | 3.0 | 2.2 | 7 |
| Example 12 | 0 | 11 | 2.6 | 1.7 | 7 |
| Comparative Example 1 | 0 | 8 | 3 | 5.8 | 2 |
| Comparative Example 2 | 0 | 7 | 22 | 2.2 | 1 |
| Comparative Example 3 | 0 | 10 | 3 | 5.2 | 2 |
| Comparative Example 4 | 0 | 10 | 45 | 2.1 | 4 |
| Comparative Example 5 | 10 | 8 | 20 | 2.5 | 4 |

As shown in Table 3, the coated products obtained in Examples 1 to 12 are confirmed to be low in the oxygen permeability as compared with Comparative Examples 2, 4 and 5, low in the adhesion of a hydrous sheet to metal as compared with Comparative Examples 1 and 3, and large in the maximum number of folded sets as compared with Comparative Examples 1 to 5. Furthermore, it was confirmed also that the coated products obtained in Examples 1 to 12 had maximum draw ratios as high as 8 or more. It, therefore, has been found that the resin composition of the present invention exhibits low adhesion to a metal roll during production and can form a coated product superior in oxygen barrier property and resistance to folding. Furthermore, it was also found that the maximum draw ratio at the time of production was high.

Example 13

A 100 μm thick resin composition sheet was obtained in the same manner as in Example 1 except that ECOFILM (trademark) (6.75 kg), National 1658 (2.25 kg), ELVANOL (trademark) 71-30 (0.90 kg) and ALKOX (trademark) L-11 (100 g) were used as raw materials, and the resin composition was shaped not into pellets but into a sheet shape through a 300 mm coated hanger die and then dried by passing it over a metal roll heated to 90° C.

Furthermore, a multilayer sheet was obtained by bonding 200 μm thick PET sheets (NOVACLEAR A3020 manufactured by Mitsubishi Chemical Corporation) to both sides of the obtained resin composition sheet with an adhesive (a 10:1 (mass ratio) mixture of TAKELAC A520 and TAKENATE A50 manufactured by Mitsui Chemicals, Inc.). By performing thermoforming of the multilayer sheet using a pressure and vacuum thermoforming machine (FKS-0632-20 manufactured by Asano Laboratories Co., Ltd.) under the condition specified by a heater temperature of 600° C., a sheet surface temperature of 120° C., a heating time of 10 seconds, and a molding pressure of 3 $kg/cm^2$, the multilayer sheet was formed into a cup (inner diameter: 70 mm, height: 110 mm) shape. Rupture, uneven thickness, cloudiness, etc. were not observed in the obtained molded article.

Example 14

A 100 μm thick resin composition sheet was obtained in the same manner as in Example 13 except that Kuraray Poval (trademark) 5-98 was used as the polyvinyl alcohol (B).

Example 15

A 100 μm thick resin composition sheet was obtained in the same manner as in Example 13 except that ECOFILM (trademark) (6.82 kg), National 1658 (2.27 kg), ELVANOL (trademark) 71-30 (0.90 kg), and ALKOX (trademark) L-11 (10 g) were used as raw materials.

Example 16

A 100 μm thick resin composition sheet was obtained in the same manner as in Example 13 except that ECOFILM (trademark) (6.08 kg), National 1658 (2.03 kg), ELVANOL (trademark) 71-30 (0.90 kg), and ALKOX (trademark) L-11 (1.00 kg) were used as raw materials.

Example 17

A 100 μm thick resin composition sheet was obtained in the same manner as in Example 13 except that ALKOX (trademark) L-6 was used as the polyoxyalkylene (C).

Example 18

A 100 μm thick resin composition sheet was obtained in the same manner as in Example 13 except that ALKOX (trademark) E-75G was used as the polyoxyalkylene (C).

Example 19

A 100 μm thick resin composition sheet was obtained in the same manner as in Example 13 except that ALKOX (trademark) EP1010N was used as the polyoxyalkylene (C).

Example 20

A 100 μm thick resin composition sheet was obtained in the same manner as in Example 13 except that ECOFILM (trademark) (6.53 kg), National 1658 (2.18 kg), ELVANOL (trademark) 71-30 (0.90 kg), ALKOX (trademark) L-11 (100 g), and Sorbitol SP (300 g) were used as raw materials.

Comparative Example 6

A 100 μm thick resin composition sheet was obtained in the same manner as in Example 13 except that ECOFILM (trademark) (6.83 kg), National 1658 (2.28 kg), and ELVANOL (trademark) 71-30 (0.90 kg) were used as raw materials.

Comparative Example 7

A 100 μm thick resin composition sheet was obtained in the same manner as in Example 13 except that ECOFILM (trademark) (6.68 kg), National 1658 (2.23 kg), ELVANOL (trademark) 71-30 (0.90 kg), and CLOISITE (registered trademark) 20A (200 g) were used as raw materials.

Comparative Example 8

A 100 μm thick resin composition sheet was obtained in the same manner as in Example 13 except that ECOFILM (trademark) (7.43 kg), National 1658 (2.48 kg) and ALKOX (trademark) L-11 (100 g) were used as raw materials.

Comparative Example 9

A 100 μm thick resin composition sheet was obtained in the same manner as in Example 13 except that ECOFILM (trademark) (6.82 kg), National 1658 (2.27 kg), ELVANOL (trademark) 71-30 (0.90 kg), and ALKOX (trademark) L-11 (5 g) were used as raw materials.

Comparative Example 10

A 100 μm thick resin composition sheet was obtained in the same manner as in Example 13 except that ECOFILM (trademark) (5.70 kg), National 1658 (1.90 kg), ELVANOL (trademark) 71-30 (0.90 kg), and ALKOX (trademark) L-11 (1.50 kg) were used as raw materials.

Comparative Example 11

A 100 μm thick resin composition sheet was obtained in the same manner as in Example 13 except that ECOFILM (trademark) (6.00 kg), National 1658 (2.00 kg), ELVANOL (trademark) 71-30 (0.90 kg), ALKOX (trademark) L-11 (100 g), and Sorbitol SP (1.00 kg) were used as raw materials.

The content of a modified starch (A) and its average amylose content, the degree of saponification, the viscosity (20° C.) in a 4% aqueous solution, and the content of a polyvinyl alcohol (B), the brand, the weight average molecular weight, and the content of a polyoxyalkylene (C), the content of a polyol plasticizer (D) as well as the color tone (b value), the oxygen permeability, the impact strength under low humidity of a resin composition sheet are shown in Table 4.

TABLE 4

| | Modified starch (A) | | Polyvinyl alcohol (B) | | | Polyoxyalkylene (C) | | |
|---|---|---|---|---|---|---|---|---|
| | Average amylose content (mass %) | Content (mass %) | Degree of saponification (mol %) | Viscosity (mPa · s) | Content (mass %) | Brand | Weight-average molecular weight | Content (mass %) |
| Example 13 | 57.5 | 90 | 99.0-99.8 | 27-33 | 9 | L-11 | 100,000 | 1 |
| Example 14 | 57.5 | 90 | 98 | 5 | 9 | L-11 | 100,000 | 1 |
| Example 15 | 57.5 | 90.9 | 99.0-99.8 | 27-33 | 9 | L-11 | 100,000 | 0.1 |
| Example 16 | 57.5 | 81 | 99.0-99.8 | 27-33 | 9 | L-11 | 100,000 | 10 |
| Example 17 | 57.5 | 90 | 99.0-99.8 | 27-33 | 9 | L-6 | 60,000 | 1 |
| Example 18 | 57.5 | 90 | 99.0-99.8 | 27-33 | 9 | E-75G | 2,000,000 | 1 |
| Example 19 | 57.5 | 90 | 99.0-99.8 | 27-33 | 9 | EP1010N | 100,000 | 1 |
| Example 20 | 57.5 | 87 | 99.0-99.8 | 27-33 | 9 | L-11 | 100,000 | 1 |
| Comparative Example 6 | 57.5 | 91 | 99.0-99.8 | 27-33 | 9 | — | — | 0 |
| Comparative Example 7 | 57.5 | 89 | 99.0-99.8 | 27-33 | 9 | — | — | 0 |
| Comparative Example 8 | 57.5 | 99 | — | — | 0 | L-11 | 100,000 | 1 |
| Comparative Example 9 | 57.5 | 90.95 | 99.0-99.8 | 27-33 | 9 | L-11 | 100,000 | 0.05 |
| Comparative Example 10 | 57.5 | 76 | 99.0-99.8 | 27-33 | 9 | L-11 | 100,000 | 15 |
| Comparative Example 11 | 57.5 | 80 | 99.0-99.8 | 27-33 | 9 | L-11 | 100,000 | 1 |

| | Polyol plasticizer (D) Content (mass %) | Clay Content (mass %) | Color tone (b value) | Oxygen permeability (mL · 20 μm/m² · atm · 24 hr) 23° C., 50% RH | Impact strength under low humidity (mN/μm) |
|---|---|---|---|---|---|
| Example 13 | 0 | 0 | 12 | 2.0 | 20 |
| Example 14 | 0 | 0 | 10 | 2.9 | 15 |
| Example 15 | 0 | 0 | 11 | 2.8 | 14 |
| Example 16 | 0 | 0 | 12 | 3.6 | 25 |
| Example 17 | 0 | 0 | 10 | 2.2 | 19 |
| Example 18 | 0 | 0 | 10 | 2.9 | 21 |

TABLE 4-continued

| | | | | | |
|---|---|---|---|---|---|
| Example 19 | 0 | 0 | 10 | 3.0 | 21 |
| Example 20 | 3 | 0 | 11 | 2.8 | 21 |
| Comparative Example 6 | 0 | 0 | 10 | 3.0 | 4 |
| Comparative Example 7 | 0 | 2 | 28 | 3.0 | 18 |
| Comparative Example 8 | 0 | 0 | 11 | 22 | 3 |
| Comparative Example 9 | 0 | 0 | 11 | 3.0 | 5 |
| Comparative Example 10 | 0 | 0 | 11 | 47 | 12 |
| Comparative Example 11 | 10 | 0 | 20 | 22 | 20 |

As shown in Table 4, it was confirmed that the resin composition sheets obtained in Examples 13 to 20 were low in b value as compared with Comparative Examples 7 and 11, were low in oxygen permeability as compared with Comparative Examples 8, 10 and 11, and were high in impact strength under low humidity as compared with Comparative Examples 6, 8 to 10. Therefore, it has been found that the resin composition of the present invention can form a sheet superior in oxygen barrier property, impact strength under low humidity, and color tone.

DESCRIPTION OF REFERENCE SIGNS

1: Hydrous pellet
2: Single screw extruder
3: Film-forming die
4: Hydrous composition
5: Paper
6: Coated product
7*a*: Pressure roll (made of rubber)
7*b*: Cast roll (made of metal)
7*c*: Touch roll (made of rubber)
8: Twin screw extruder
9: Hopper
10: Liquid addition nozzle
11: Resin temperature meter
12: Resin pressure meter
13: Adapter
14: Die

The invention claimed is:

1. A resin composition comprising:
50 to 98 parts by mass of a modified starch (A);
2 to 50 parts by mass of a polyvinyl alcohol (B);
0.5 to 10 parts by mass of a polyoxyalkylene (C); and optionally
0 to 5 parts by mass of a polyol plasticizer (D),
wherein the total content of the (A), (B), (C) and (D) is 100 parts by mass, and
wherein the polyoxyalkylene has an average molecular weight of 50,000 or more and 3,000,000 or less.

2. The resin composition according to claim 1, wherein the total content of the modified starch (A), the polyvinyl alcohol (B), the polyoxyalkylene (C) and the polyol plasticizer (D) is 80% by mass or more with respect to the mass of the resin composition.

3. The resin composition according to claim 1, wherein the modified starch (A) has an average amylose content of 50% by mass or more.

4. The resin composition according to claim 1, wherein the modified starch (A) is at least one selected from the group consisting of an etherified starch, an esterified starch, a cationized starch, and a crosslinked starch.

5. The resin composition according to claim 1, wherein the modified starch (A) is at least one selected from the group consisting of an etherified starch having a hydroxyalkyl group having 2 to 6 carbon atoms and an esterified starch having a structural unit derived from a dicarboxylic anhydride.

6. The resin composition according to a claim 1, wherein a 4% aqueous solution of the polyvinyl alcohol (B) has a viscosity of 1 to 50 mPa·s at 20° C. measured in accordance with JIS Z 8803.

7. A hydrous composition comprising the resin composition according to claim 1, wherein the hydrous composition has a water content of 1 to 50% by mass.

8. A coated product in which a paper or a film is coated with the hydrous composition according to claim 7.

9. A multilayer structure comprising the coated product according to claim 8 and one or more layers (X).

10. A packaging material comprising the coated product according to claim 8.

11. A method for producing the coated product according to claim 8, comprising a step of coating a paper or a film conveyed by a winding device with the hydrous composition by using an extruder, wherein during the step, a draw ratio is 5 to 20 where the draw ratio is represented by Formula (1):

Draw Ratio=(Winding speed of the winding device (m/s))/(Flow rate at an die outlet of the extruder (m/s)) (1).

12. A film or sheet comprising the resin composition according to claim 1.

13. A laminate comprising the film or sheet according to claim 12 and one or more layers (X).

14. A packaging tray or cup comprising the film or sheet according to claim 12.

15. A method for producing the packaging tray or cup according to claim 14, comprising a step of obtaining a film or sheet by shaping the resin composition by using an extruder, a step of obtaining a laminate by laminating the resulting film or sheet and one or more layers (X) together by lamination, and a step of thermoforming the resulting laminate into a packaging tray or cup.

16. The resin composition according to claim 1, wherein the resin composition comprises 4 parts by mass or less of the polyol plasticizer (D).

17. The resin composition according to claim 1, wherein the resin composition comprises 3 parts by mass or less of the polyol plasticizer (D).

18. The resin composition according to claim 1, wherein the modified starch (A) comprises two or more modified starches and has an average amylose content of 50% by mass or more.

19. The resin composition according to claim 1, wherein the modified starch (A) comprises two or more modified starches, and wherein at least one of the modified starches comprises an etherified starch having a hydroxyalkyl group having 2 to 6 carbon atoms.

20. The resin composition according to claim 1, wherein the resin composition excludes a fatty acid having 12 to 22 carbon atoms or salt thereof.

* * * * *